April 16, 1963    G. O. SUTHERLAND    3,086,115
TILTABLE X-RAY TABLE STRUCTURE
Filed April 4, 1960    3 Sheets-Sheet 3

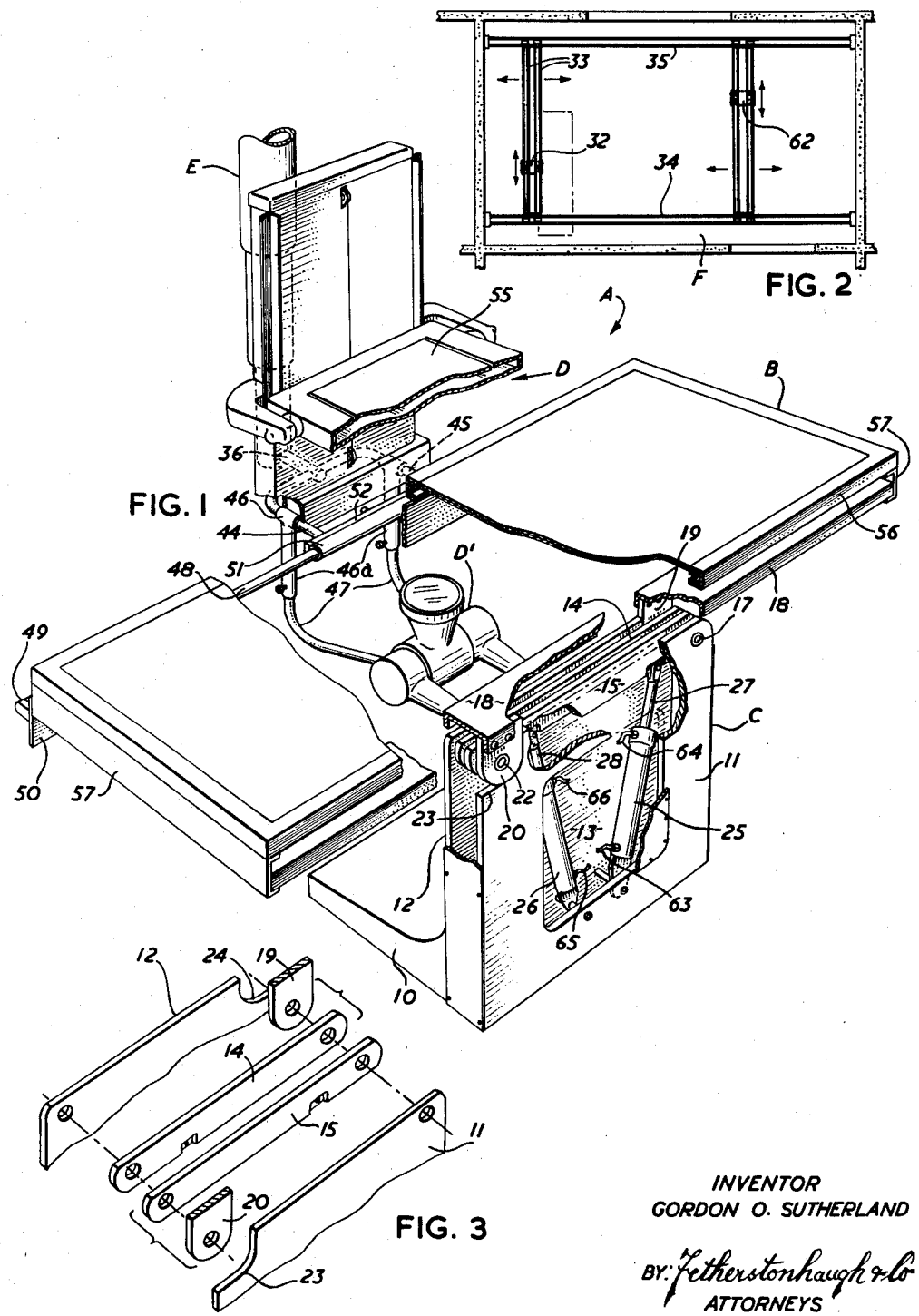

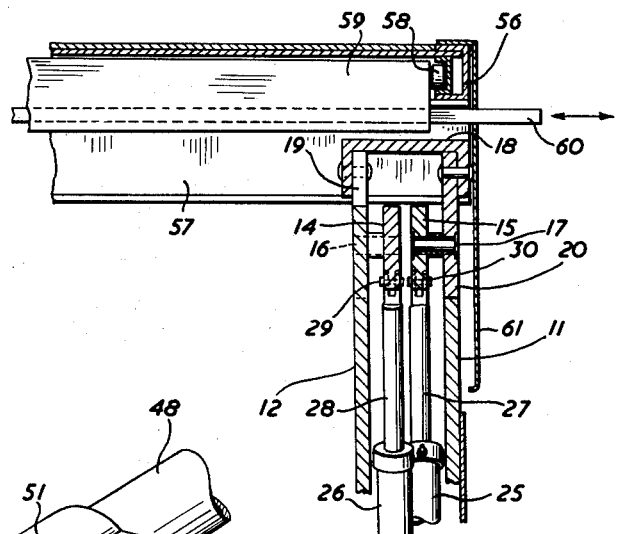
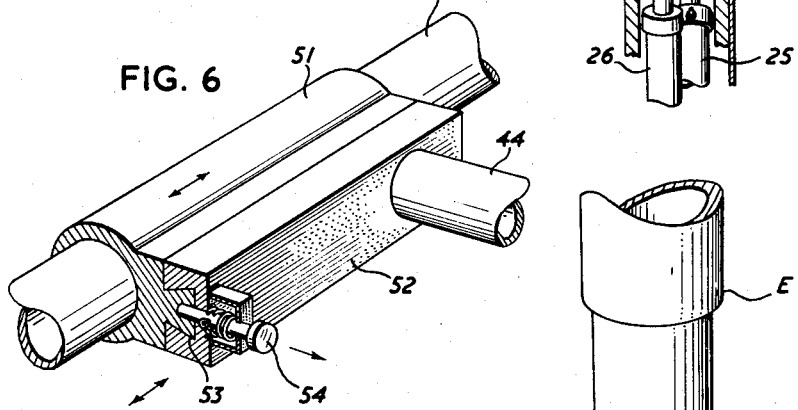
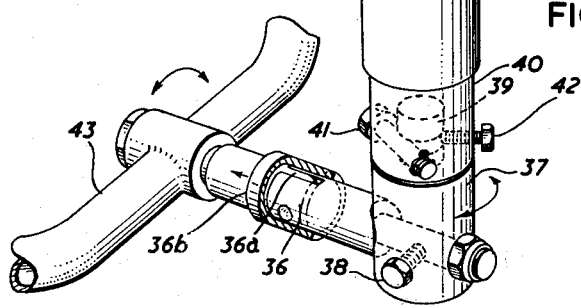

INVENTOR
GORDON O. SUTHERLAND
BY: Fetherstonhaugh & Co
ATTORNEYS

United States Patent Office 3,086,115
Patented Apr. 16, 1963

3,086,115
TILTABLE X-RAY TABLE STRUCTURE
Gordon O. Sutherland, 69 Chaplin Crescent, Toronto, Ontario, Canada
Filed Apr. 4, 1960, Ser. No. 19,545
6 Claims. (Cl. 250—55)

This invention relates to tiltable X-ray table structure and installations therefor.

Tiltable X-ray tables are well-known and many and various structures have previously been proposed. For various reasons, it is most desirable to have the table tilt from horizontal position through 90° in both directions and while this has been previously accomplished in complicated and heavy constructions usually in more simplified constructions, it is only possible to tilt the table in one direction to 90° and to partially tilt it in the opposite direction due to the placement and arrangement of the operating mechanism. In addition, it is usual to mount the fluoroscope and screen therefor on the table framework so that, on the one hand, movement of the fluoroscope relatively to the table is within the limits of the length and width of the table, whereas it is necessary to provide for a counter-balancing means for the fluoroscope where it is slid relatively to the table when in the tilted position. Therefore, on the one hand, this limit of adjustment restricts the use of the fluoroscopic apparatus to some extent and, on the other, due to the fact that the table supports the weight of the fluoroscope as well as the counter weight, it is obvious that a reasonably heavy structure must be provided to meet these requirements. Furthermore, fluoroscopic examination is limited by such structures to a direction perpendicular to the plane of the table whereas it is often desirable that examinations can be made in a direction parallel to the plane of the table in the case where the patient may not be turned on his side for the purpose. Consequently, to achieve an examination of this kind, it will be necessary to employ extra fluoroscopic apparatus and set it up to effect the purpose. Apart from these disadvantages, it is apparent that where the fluoroscopic apparatus is supported as a part of the table structure, this often is in the way when other types of examinations are necessary on the table.

The present invention avoids the disadvantages of prior structures while providing additional advantages in a construction which is generally simply and relatively light in weight and which will permit disconnection and rearrangement of the fluoroscopic apparatus with respect to the table while providing a structure that will give full tilt in both directions as to provide a unit which may be used with great facility.

The invention generally comprises an X-ray table structure capable of tilting in opposite directions from horizontal position to vertical position embodying a table top, a vertical supporting frame therefor connectable with said top adjacent one side edge thereof and means for tiltably connecting said top with said frame including a pair of links disposed in side by side spaced apart parallel relation, each having an opposite end pivotally connected to the frame in opposed relation to one another, a connector element pivotally secured to the other end of each link and rigidly connected to said table top, the pivotal axis between each connector and each link being common to the pivotal axis of connection between the other link and said frame, and actuating means connected to said links and located on said frame below said links and between said points of pivotal connection, for selectively swinging said table top from horizontal position to full vertical position beyond the ends of the frame in either direction and vice versa. The invention also includes means for coordinating and guidably connecting independently supported fluoroscopic apparatus with said tiltable table top as to cooperate therewith in all positions of adjustment thereof.

The invention will be fully understood by reference to the following detailed specification taken in conjunction with the accompanying drawings.

In the drawings:

FIG. 1 is a perspective partly fragmentary illustration of the X-ray table structure according to the present invention generally illustrating the arrangement of the parts and mode of support of the fluoroscopic apparatus in relation thereto.

FIG. 2 is a miniature schematic top plan illustration of an X-ray room to illustrate the carriages arranged for movement and adjustment of the X-ray apparatus and fluoroscopic apparatus.

FIG. 3 is a perspective exploded view of the linkage employed in the supporting framework for mounting and tilting the table.

FIG. 4 is an enlarged fragmentary sectional view taken through one end of the table supporting framework to illustrate the arrangement of the table tilting linkage and mounting and general construction of the table.

FIG. 5 is an enlarged fragmentary perspective of the lower end of the supporting column for the fluoroscopic apparatus to illustrate the manner in which the fluoroscopic apparatus may be adjusted to coordinate with the operation of the table.

FIG. 6 is an enlarged fragmentary partly sectional perspective illustration of the manner in which the fluoroscopic supporting apparatus is detachably and slidably linked with the table.

Figure 7:
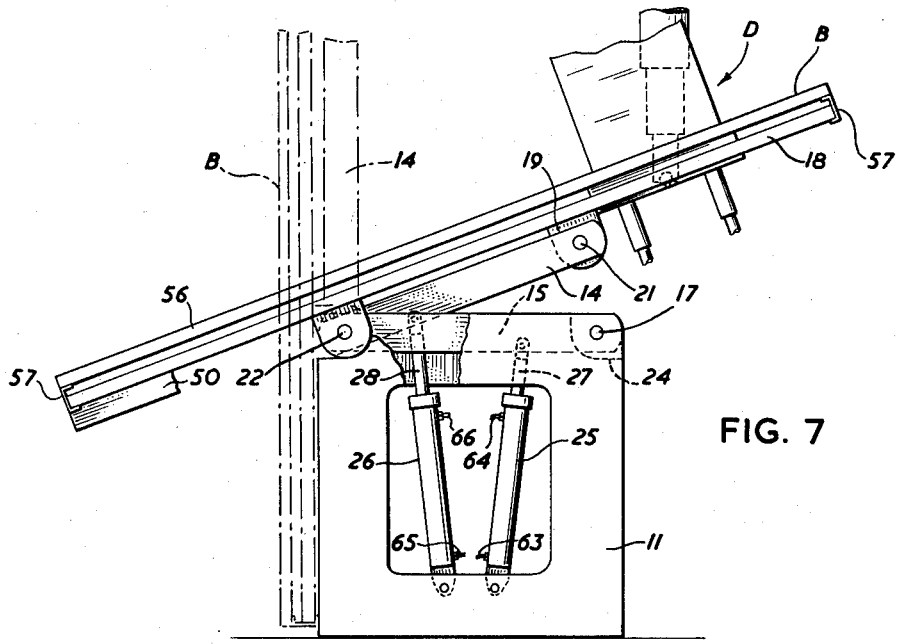
FIG. 7 is a schematic side elevation of the table to illustrate the manner in which it may be tilted from normal horizontal position to full vertical position in one direction.

Referring to the drawings, A indicates the X-ray table structure as a whole, which is generally comprised of the table B supported from one side on the table supporting framework C. The framework C is suitably supported in upstanding vertically disposed position such as by the laterally projecting base 10. The framework C generally embodies the side elements 11 and 12 disposed in spaced apart parallel relation to one another, of any suitable structural design, preferably such that the space therebetween is generally enclosed to form a compartment 13 housing the table actuating means. Between the side supporting members 11 and 12 at the top of the framework, a pair of table tilting links 14 and 15 are mounted, the link 14 being pivotally supported on element 12 of the framework at its upper left-hand corner, as viewed in FIG. 1, by means of a suitable stub shaft 16 (FIGS. 4 and 8), link 15 being pivotally secured to the upper right-hand corner of element 11 of the framework, as viewed in FIG. 1, by means of a suitable stub shaft 17. The table B is rigidly mounted from one side thereof on a supporting beam 18 which extends longitudinally of the framework C and overlies its upper extremity. This beam may conveniently take the form of a channel member which is rigidly secured to each of the links 14 and 15 by means of the plates 19 and 20, respectively, which depend from the channel beam 18, one on each side thereof, the plate 19 being pivotally secured to the link 14 by means of the stub shaft 21 (FIG. 7) while plate 20 is pivotally connected with link 15 by means of the stub shaft 22.

Preferably, for compactness of structure, the plates 19 and 20 are aligned with the side elements 11 and 12 of the framework and which, respectively, are formed with recessed portions 23 and 24 (see FIGS. 7 and 8 particularly) to receive and support the plates 19 and 20 when either or both of the links 14 and 15 are disposed in horizontal position. Where, however, the links 14 and 15 are not co-planar with the side elements 11 and 12, suitable supports would be employed on the frame to engage and support plates 19 and 20. Within the compartment 13, suitable actuating means for the links 14 and 15 is housed, which preferably comprises fluid operated cylinders 25 and 26, respectively, such as hydraulic cylinders which are pivoted in the base of the framework for swinging movement and carry the piston rods 27 and 28, respectively, in turn pivotally connected as at 29 and 30 to the links 14 and 15. As shown in FIG. 1, the cylinders 25 and 26 and their piston rods are disposed in normal set position diverging from their pivotal anchorage with the frame outwardly from one another so that when selectively operated, they will cause their respective links to pivot in the appropriate direction for table tilting purposes.

Figure 8:
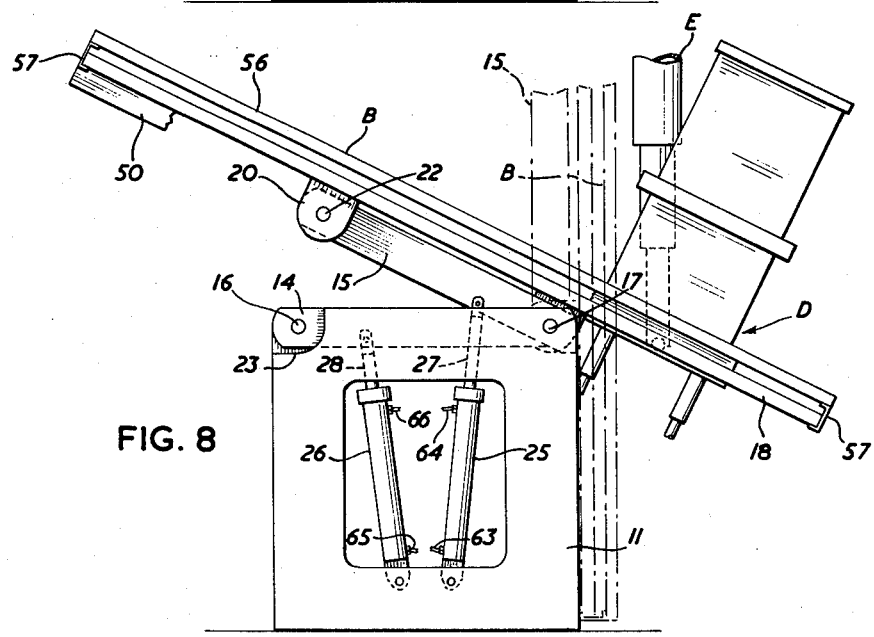
FIG. 8 is a similar view to FIG. 7 illustrating the manner in which the table can be correspondingly tilted through a full 90° in the opposite direction.
Figure 9:
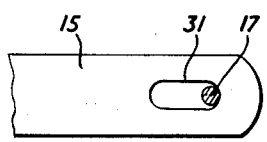
FIG. 9 is a fragmentary detail of an alternative manner of connecting one end of each table tilting link.

Assuming that cylinder 25 is actuated so as to cause its piston rod to move axially outwardly of the cylinder, link 15 will be caused to swing upwardly on its pivotal axis 17 as to cause the table to tilt, as illustrated in FIG. 8. In this instance, plate 19 is in pivotal connection with link 14 by stub shaft 21 which has a theoretical common axis with pivotal axis 17. However, link 14 is held from pivotal movement on its pivot 16 by reason of the inextensible linkage achieved between its other pivotal axis 21 and pivotal axis 17 which is effected through connection of the other end of link 15 to the plate 20 rigidly secured to the beam and through beam 18 between pivot points 21 and 22 and link 15 between pivot points 22 and 17. Consequently, in this tilting operation pivot point 21 becomes a fixed pivot and link 15 is established in fixed parallel relationship to beam 18 and its attached table top B. In this instance, it should be noted that link 15 in its association with stub shaft 17, as alternatively shown in FIG. 9, may be slotted as at 31, while still performing the inextensible linkage function, since the axial end thrust of beam 18 can be fully assumed by stub shaft pivot 21. The same holds true of the association of link 14 and stub shaft 16 and which may also be associated in this alternative way. The plates 19 and 20 perform the function of link connection to connect their respective links with the beam 18 and may be generally termed connectors. As clearly noted from FIG. 8, the table may be tilted through a full 90° from the horizontal to the vertical within the outward limit of thrust of piston rod 27 by means of the arrangement of parts as above described. Similarly, the same holds true in tilting the table oppositely as shown in FIG. 7 wherein the stub shaft 22 (see FIGS. 4 and 8 particularly) becomes a fixed pivot point by means of an inextensible linkage effected in similar manner in the opposite direction, and link 14 becomes fixed in parallel relationship to beam 18 and top B.

The tilting mechanism of the table is particularly simple in character and housed within the framework C to one side of the table, leaving the space below the table entirely free, permitting ready placement and adjustment of the fluoroscope D. This unit, according to the present invention, is supported independently of the table B by means of telescoping column E of known character which will permit axial extension and retraction of the column. The column is designed to be suspended by means of a carriage 32 of well-known character adapted to travel longitudinally of the table B on suitable overhead tracks 33 (FIG. 2). These tracks 33 in turn are slidably mounted on the rigidly mounted parallel tracks 34 and 35 which extend from wall to wall of the X-ray room F adjacent the ceiling thereof. Consequently, the column E can be moved to any location in the room and can be associated with the X-ray table as to coordinate therewith in any given requirements of the operation of the table. The column E is secured on the carriage 32 in known manner so that by means of the telescoping as well as shifting action, full coordination is achieved.

The fluoroscope unit D is attached to the column E by adjustable connecting means including the shaft 36 (FIG. 5) which is rotatably carried in the end fitting 37 of column E and which may be secured in adjusted position in any suitable manner such as by the lock screw 38. End fitting 37 in turn is rotatably mounted on the column in any suitable manner as by means of the circumferentially grooved pintle 39 which extends into a socket in the cooperating fitting 40 adjacent the end of column E and is rotatably supported therein in any suitable manner such as by the transversely extending bolt 41 which intersects the groove of pintle 39. The fitting 37 may be secured in adjusted position by suitable means such as the lock screw 42. A further adjustment for the fluoroscope equipment is readily provided by forming the shaft 36 in two hingedly connected sections, hinged as at 36a and normally rendered rigid by the slidable sleeve 36b which may be slid on the shaft to encompass the hinged formation.

The shaft 36 has attached to its projecting end a preferably tubular frame 43 which is generally U-shaped in structure, as shown in FIG. 1, and which carries the arms 44 and 45 axially adjustable in sockets 46 and from which socket members 46a depend, adjustably to receive the supporting bars 47 of the fluoroscope X-ray tube D', which bars are secured by suitable screw securing means as shown. Therefore, relative adjustment of fluoroscope X-ray table D' towards and away from the table and transversely of the table is readily achieved.

To the edge of the table B, opposite to its mounting side, I secure a rail or guide bar 48 which runs longitudinally of the table throughout its length and may be secured at each end by a suitable bracket 49 carried on a suitable side plate 50. Rail 48 provides a guide rail for the fluoroscopic unit D which is slidably connected thereto by means of a sliding sleeve 51 detachably connected with the arms 44 and 45 of the fluoroscope supporting frame. This may be achieved in any suitable manner and such as by connecting the arms 44 and 45 to a bar 52 (see FIG. 6 particularly). This may be connected to the sleeve 51 by means of the dovetail groove and key 53 and detachably locked in any suitable manner such as by the spring-pressed pin 54. Any suitable locking means is provided to retain sleeve 51 at desired location along the length of rail 48. Accordingly, the fluoroscopic apparatus is coordinated with the table B as to dispose the fluorescent screen 55 thereof above the table. Consequently, the fluoroscopic X-ray tube D' and screen 55 may be adjusted longitudinally of the table throughout its length as may be required and, by reason of the adjustments provided in respect to its connecting attachment to the column E, can be used cooperatively in any adjusted angle of the table, including adjustment transversely of and perpendicularly to the plane of the table. However, by reason of the independent support of the fluoroscopic apparatus which is therefore linked with the table in guided relation only, it is clear that the table and its supporting structure may be constructed as a reasonably light unit eliminating the heavier structures required in the prior art necessary to support the fluoroscope unit and the employment of counter-balancing means which has rendered prior apparatus heavy and cumbersome. Moreover, by reason of the detachable connection between the guide sleeve 51 and the bar 52, the fluoroscopic unit can be completely detached from the table in a very simple operation as to make the table available and unencumbered for X-ray and other uses when such other types of examination are necessary. In addition, by reason of this arrangement, the fluoroscopic apparatus may be employed to conduct examinations previously not possible in other structures. It is often desirable to conduct fluoroscopic examinations in a direction parallel to the plane of the table in the case where the patient may not be turned on his side for the purpose. Accordingly, when this type of examination is called for, it has been necessary to employ extra fluoroscopic apparatus and set it up to achieve the necessary result. Under the present invention, fluoroscopic apparatus may be completely disconnected as above described and adjusted to provide for examination in a direction parallel to the plane of the table, the table being completely unencumbered. This may be readily achieved by raising the column E and adjusting the fluoroscope as by rotating the shaft 36 and/or the fitting 37.

The table, as indicated, may be of a light conventional structure having the frame 56 supported by suitable transverse end members 57 carried by the channel beam 18 disposing the frame 56 in vertically spaced relation to the channel. The frame members are preferably of channel construction as to provide for support of the rollers 58 (FIG. 4) of an X-ray film carriage 59, the film frame 60 being introduced and withdrawn from frame 59 through the space between channel 18 and frame 56. Preferably a side apron 61 is carried by the frame 56 to depend along the mounting side of the table and which may be slotted for passage of the X-ray film. For radiography the fluoroscope is readily detached from the table if necessary, as above described, and a radiographic X-ray tube carried on a movable carriage 62 (FIG. 1) may be brought to any location in the X-ray room to cooperate with the table in its horizontal or any of its angularly adjusted positions.

The structure is, as indicated, preferably operated by hydraulic cylinders connected in a hydraulic system operable by control valve means so that the cylinders may be selectively operated as required to actuate a cylinder, to create desired tilt of the table, and subject the other cylinder to fluid lock. These cylinders are mounted compactly within the suporting frame between the pivotal points of the links 14 and 15 and directly below the links, thus to provide a very compact structure whereby the links may be selectively pivoted to swing the table top from horizontal position to full vertical position beyond the ends of the frame in either direction and vice versa, fluid being supplied to one side of the piston of said cylinders and withdrawn from the other through the usual ports, such as 63 and 64 in the case of cylinder 25, and 65 and 66 for cylinder 25. It is obvious that the necessary pump and reservoir of such hydraulic circuits can be located at a point remote from the table location as to eliminate any source of noise there, while suitable switch controls are locatable at the table for use of the operator.

It is obvious from the foregoing description that a very light durable table structure is provided which in addition to its ease of operation by a very simple mechanism has the advantage of economy of production as compared with the heavier complex table structures of the prior art. In addition, by means of the coordinating connection of the independently supported fluoroscope apparatus capable of cooperative action in all positions of the table, the structure has the advantage of ready disconnection of the fluoroscope apparatus not only to provide a completely free table where this may be required, but also permits required use of the fluoroscope apparatus in ways not possible with prior apparatus supporting and mounting the fluoroscopic apparatus.

What I claim as my invention is:
1. X-ray table structure capable of tilting in opposite directions from horizontal position to vertical position comprising a table top, a vertical supporting frame therefor connectable with and between the ends of said top, adjacent one side edge thereof and means for tiltably connecting said top with said frame including a pair of links normally disposed in horizontal side by side spaced apart parallel relation and maintaining said top in horizontal position, each link having an opposite end pivotally connected to the frame in opposed relation to one another, a connector element pivotally secured to the other end of each link and rigidly connected to said table top, the pivotal axis between each connector and each link being common to the pivotal axis of connection between the other link and said frame, and actuating means connected to said links and located on said frame below said links and between said points of pivotal connection, for selectively swinging said table top on a fixed axis from horizontal position to full vertical position beyond the ends of the frame and vice versa in either direction.

2. X-ray table structure as claimed in claim 1 in which the means for actuating said links comprises a pair of fluid actuated cylinders anchored within the frame in side by side relation and upwardly and outwardly diverging in a direction towards the pivot points of said links, said cylinders including pistons, each having a piston rod pivotally connected to its respective link intermediate the ends of the latter.

3. An X-ray table as claimed in claim 1 wherein said actuating means comprises a pair of expandible and contractable elements, each swingably connected at one end to said frame and at the other end to a different one of said links.

4. An X-ray table as claimed in claim 3 wherein each expandible and contractable element is connected to its respective link nearer to the link-frame connection thereof than to the link-table top connection thereof.

5. X-ray table structure as claimed in claim 4 wherein each expandible and contractable element is connected to said frame on the side thereof nearer the link-frame connection of the link to which said expandible and contractable element is connected.

6. X-ray table structure as claimed in claim 4 wherein said expandible and contractable elements each comprise fluid actuated cylinders anchored within the frame in side by side relation, said cylinders diverging outwardly and upwardly toward the link-frame connection of the link to which the respective element is connected, said cylinders each including pistons, each having a piston rod pivotally connected to its respective link.

References Cited in the file of this patent
UNITED STATES PATENTS

| | | |
|---|---|---|
| 1,749,530 | Flowers | Mar. 4, 1930 |
| 2,208,258 | Grobe | July 16, 1940 |
| 2,232,014 | Simon | Feb. 18, 1941 |
| 2,508,449 | Davis et al. | May 23, 1950 |
| 2,526,879 | Kizaur | Oct. 24, 1950 |
| 2,534,623 | Pitts et al. | Dec. 19, 1950 |
| 2,668,912 | Goldfield | Feb. 9, 1954 |
| 2,692,173 | Lowitzsch | Oct. 19, 1954 |
| 2,700,735 | Kizaur | Jan. 25, 1955 |
| 2,997,585 | Schiring | Aug. 22, 1961 |